United States Patent
Yoshida et al.

(10) Patent No.: US 6,517,761 B2
(45) Date of Patent: Feb. 11, 2003

(54) METHOD FOR EMBEDDING PART IN BASE MADE OF THERMOPLASTIC RESIN

(75) Inventors: Yutaka Yoshida, Tsukuba-gun (JP); Katsumi Iijima, Tsukuba-gun (JP); Koji Wada, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/906,780

(22) Filed: Jul. 18, 2001

(65) Prior Publication Data

US 2002/0014714 A1 Feb. 7, 2002

(30) Foreign Application Priority Data

Aug. 3, 2000 (JP) ......................................... 2000-235798

(51) Int. Cl.[7] .......................... B29C 65/02; B29C 70/70
(52) U.S. Cl. .................... 264/274; 264/271.1; 264/320; 264/322
(58) Field of Search ................................. 264/248, 249, 264/274, 267, 319, 320, 322, 271.1

(56) References Cited

U.S. PATENT DOCUMENTS

| | | | | |
|---|---|---|---|---|
| 3,494,998 A | * | 2/1970 | Anhalt ....................... 264/249 |
| 3,497,952 A | * | 3/1970 | King et al. .................... 29/629 |
| 3,872,572 A | * | 3/1975 | Hahn .......................... 264/249 |
| 3,998,824 A | * | 12/1976 | Otsuki et al. ............. 264/271.1 |
| 4,114,976 A | * | 9/1978 | Selvin et al. ................ 264/274 |
| 5,266,258 A | * | 11/1993 | Martin ........................ 264/249 |
| 5,584,113 A | * | 12/1996 | Hovorka ....................... 29/530 |

* cited by examiner

Primary Examiner—Angela Ortiz
(74) Attorney, Agent, or Firm—Oblon, Spivak, McClelland, Maier & Neustadt, P.C.

(57) ABSTRACT

An embedding hole is formed in a base made of thermoplastic resin, an embedded part is inserted in the embedding hole, the base is subjected to heating treatment for softening the base to bring the base into an elastomeric region and restraining treatment for restricting outward thermal expansion of the base to thereby expand the base in an inward direction of the embedding hole $2a$ to reduce a hole diameter and to deform a hole wall of the embedding hole along a shape of an outer wall face of the embedded part and to bring the hole wall into close contact with the outer wall face, and then the base is cooled and hardened.

15 Claims, 8 Drawing Sheets

METHOD FOR EMBEDDING PART IN BASE MADE OF THERMOPLASTIC RESIN

TECHNICAL FIELD

The present invention relates to a method for embedding an embedded part such as a nut in a base made of thermoplastic resin.

PRIOR ART

Conventionally, in order to embed a metal nut for mounting a part such as a solenoid valve in a base made of thermoplastic resin, a hole smaller than an outer peripheral shape of the metal nut is first formed in the base, the metal nut is axially aligned with and disposed on the hole, and then a horn of an ultrasonic oscillator is brought into contact with the metal nut, ultrasonic vibration is applied to the metal nut through this horn to thereby generate frictional heat between the metal nut and the base. While melting and plasticating a periphery of the hole in the base by this frictional heat, the metal nut is pressurized and press-fitted in the hole by the horn.

However, because the above method for embedding the metal nut by using ultrasonic vibration requires equipment and devices such as the ultra sonic oscillator, the cost is high. Moreover, because rigidity of the base made of resin is low and a portion of the base in contact with the metal nut is softened by the frictional heat when the metal nut is press-fitted in the hole of the base by the horn, the metal nut is liable to be press-fitted in a tilted state and it is difficult to embed the metal nut with accuracy. Furthermore, it is difficult to embed the metal nut in an intermediate portion of a wall thickness of the base in a state in which a hole having a diameter smaller than an outside diameter of the metal nut is communicating with an entrance side of the intermediate portion.

DISCLOSURE OF THE INVENTION

The present invention has been accomplished with the above problems in view and it is an object of the invention to provide a method for embedding an embedded part in a base with accuracy.

It is another object of the invention to provide a method for embedding an embedded part in an intermediate portion of a wall thickness of a base in a state in which a hole having a diameter smaller than an outside diameter of the embedded part is communicating with an entrance side of the intermediate portion.

To achieve the above objects, according to the invention, there is provided a method for embedding a part, wherein an embedding hole is formed in a base made of thermoplastic resin, an embedded part is inserted in the embedding hole, the base is subjected to heating treatment for softening the base to bring the base into an elastomeric region and restraining treatment for restricting outward thermal expansion of the base to thereby expand the base in an inward direction of the embedding hole to reduce a hole diameter and to deform a hole wall of the embedding hole along a shape of an outer wall face of the embedded part and to bring the hole wall into close contact with the outer wall face, and then the base is cooled and hardened to thereby fix the embedded part in the embedding hole.

The base may be subjected to the heating treatment and the pressurizing treatment at different steps but the base is preferably heated while restricting outward thermal expansion of the base.

According to the method of the invention having the above structure, because the embedded part is inserted in the embedding hole of the base in advance and the base is heated in this state to thereby reduce the hole diameter of the embedding hole and to fix the embedded part in the embedding hole, it is possible to embed the embedded part straight in the embedding hole of the base with accuracy by a simple method as compared with a prior-art method in which the embedded parts are successively press-fitted in the base while softening the base by frictional heat due to ultrasonic vibration.

According to an embodiment of the invention, means for restricting the thermal expansion of the base is a metal mold and the base is heated while the base is housed in the metal mold.

According to another embodiment of the invention, both means for heating the base and means for restricting the thermal expansion are fluid and the base is immersed in the fluid and heated while being pressurized from a periphery by the fluid a temperature and pressure of which have been increased in a state in which the base is vacuum-packed in a covering having heat resistance, airtightness, and flexibility.

In the invention, by making a depth of the embedding hole formed in the base larger than a length of the embedded part and inserting the embedded part on a bottom portion side of the embedding hole, it is possible to form a small-diameter portion having a diameter smaller than an outside diameter of the embedded part on an entrance side of the embedding hole by reduction of the hole diameter.

As the embedded part, a nut having an outer surface provided with a depression and a projection is used suitably.

According to the invention, there is provided a method for embedding a part in a base made of thermoplastic resin, wherein a first base made of thermoplastic synthetic resin in which an embedding hole is formed in a junction face and an embedded part is inserted in the embedding hole and a second base made of thermoplastic synthetic resin having a through hole are joined to each other with the through hole communicating with the embedding hole, a joined body is subjected to heating treatment for softening both the bases to bring the bases into an elastomeric region and pressurizing treatment from a periphery to thereby expand both the bases in an inward direction of the embedding hole to reduce a hole diameter, to deform a hole wall along a shape of an outer wall face of the embedded part to bring the hole wall into close contact with the outer wall face, and to weld and integrate both the bases to and with each other through the junction faces, and then the joined body is cooled and hardened to thereby embed and fix the embedded part in an intermediate portion of the integrated two bases.

According to an embodiment of the invention, means for pressurizing the joined body is a metal mold and the joined body is heated and pressurized while the joined body is housed in the metal mold.

According to another embodiment of the invention, both means for heating the joined body and means for pressurizing the joined body are fluid and the joined body is immersed in the fluid and heated and pressurized by the fluid a temperature and pressure of which have been increased in a state in which the joined body is vacuum-packed in a covering having heat resistance, airtightness, and flexibility. It is also possible that the joined body is subjected to heating treatment by proper means and then immersed and pressurized in the fluid.

DETAILED DESCRIPTION

Figure 1:
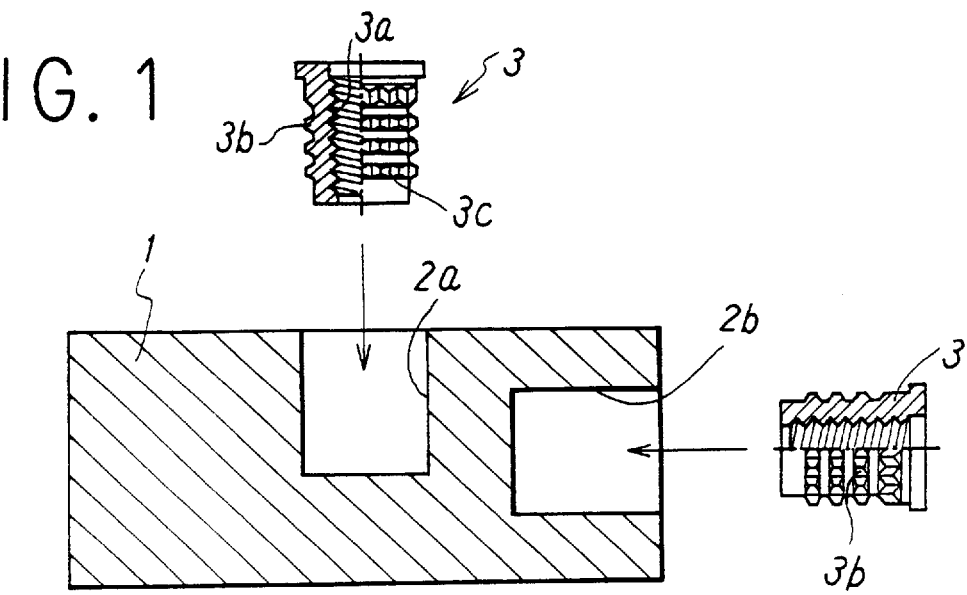
FIG. 1 is a sectional view showing an example of embedding nuts in a base by a method of the present invention and a state before embedding.

Embodiments of the present invention will be described below in detail based on the drawings. In description of the embodiments, components having the same functions are provided with the same reference numerals and described.

In the invention, first, as shown in FIG. 1, embedding holes 2a and 2b are formed by applying machining by using a drill, an endmill, a reamer, and the like to a surface of a base 1 made of transparent or opaque thermoplastic resin such as acrylic resin and embedded parts such as metal nuts 3 are respectively inserted in these embedding holes 2a and 2b. In addition to the embedding holes 2a and 2b, a groove, a through hole, and the like which will be a flow path of fluid are formed if necessary. The embedding holes 2a and 2b are circular holes having uniform inside diameters. The inside diameters are substantially equal to or slightly larger than outside diameters of the nuts 3 such that the nuts 3 can be inserted without applying large force. Depths of the embedding holes 2a and 2b are substantially the same as axial lengths of the nuts 3.

On the other hand, each the nut 3 has a cylindrical shape, has a screw hole 3a for connecting a mounted part such as a solenoid valve to be mounted onto the base 1 by screwing at a center inside the nut 3, and has a plurality of flange-shaped projections 3b at intervals on a circular outer peripheral face of the nut 3, each the projection 3b being provided at a periphery thereof with a plurality of vertical grooves 3c.

Figure 2:
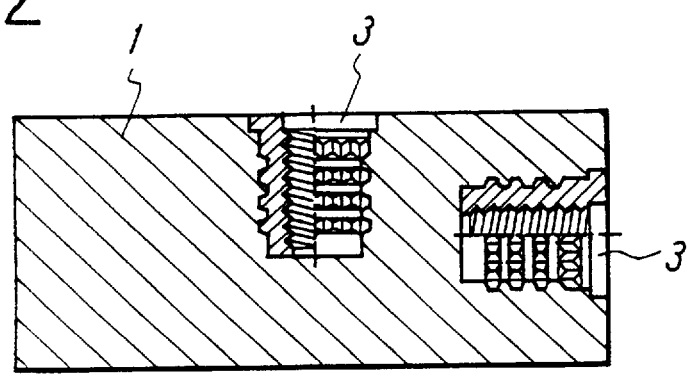
FIG. 2 is a sectional view of a state after the nuts are embedded in the base.

Then, the base 1 with the nuts 3 respectively fitted in the respective embedding holes 2a and 2b is heated at a temperature lower than a melt temperature in a state in which outward thermal expansion is restricted to bring the base 1 into an elastomeric state, i.e., a semisolid state. Because outward expansion of the base 1 is restricted, the base 1 expands in inward directions of the respective embedding holes 2a and 2b due to this heating to thereby reduce hole diameters of the embedding holes 2a and 2b. As a result, as shown in FIG. 2, hole walls of the respective embedding holes 2a and 2b are deformed along shapes of outer wall faces of the nuts 3 to thereby come in close contact with the outer wall faces. Then, by gradually cooling and hardening the base 1 for a sufficient time period so as not to generate a warp due to the heating, it is possible to obtain a product such as a manifold in which the nuts 3 are embedded and fixed into the embedding holes 2a and 2b.

Here, the temperature at which the base 1 is heated is different depending on a kind of synthetic resin forming the base 1 and is desirably 110 to 130° C. and more desirably about 115 to 125° C. when the resin is the acrylic resin.

Figure 3:
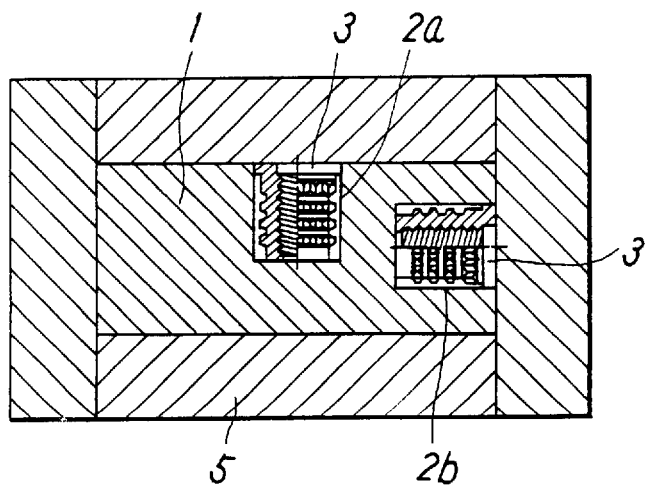
FIG. 3 is a sectional view showing an example of a step of embedding the nuts in the base.
Figure 4:
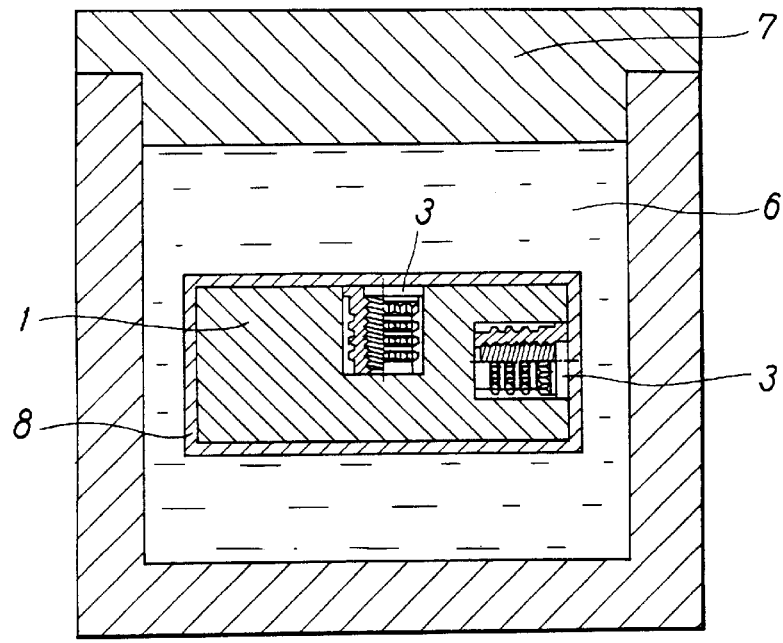
FIG. 4 is a sectional view of another example of the step of embedding the nuts in the base.

As a method for heating the base 1 while restricting outward thermal expansion of the base 1, there are methods as shown in FIGS. 3 and 4, for example. In the method shown in FIG. 3, a metal mold 5 for surrounding the base 1 from outside to restrain the base 1 is used. The base 1 is housed in the metal mold 5 and heated through the metal mold 5 in this state. In this case, the base 1 may be directly heated by the metal mold 5 by mounting a heater to the metal mold 5 or the base 1 may be indirectly heated by housing the metal mold 5 in which the base 1 is encapsulated into an oven, an oil bath, or the like and heating the metal mold 5 by radiant heat from the heater or by contact with a heated heat medium. It is also possible to pressurize the base 1 by the metal mold 5 from outside if necessary.

On the other hand, in the method shown in FIG. 4, fluid 6 such as oil is used as means for heating the base 1 and means for restricting thermal expansion, the base 1 is immersed in the fluid encapsulated in a pressure vessel 7, and a temperature of the fluid 6 is increased to a necessary temperature with the base 1 pressurized by the fluid 6 from a periphery. In carrying out this method, the base 1 is vacuum-packed in a covering 8 having heat resistance, airtightness, and flexibility such as a film formed by coating an aluminum foil with synthetic resin, for example, and is immersed in the fluid 6 in this state so as to prevent the fluid 6 from flowing into the embedding holes 2a and 2b to contaminate the hole walls and the nuts 3. In this case, in vacuum-packing the base 1 in the covering 8, it is preferable to dispose a reinforcing plate made of rubber, metal, or the like and having proper degrees of elasticity and rigidity between the base 1 and the covering 8 such that the covering 8 does not break in positions corresponding to the respective embedding holes 2a and 2b in pressurization.

Because the nuts 3 are inserted in the embedding holes 2a and 2b of the base 1 in advance and the base 1 is heated in this state to thereby reduce the hole diameters and to fix the nuts 3 in the embedding holes, it is possible to embed the nuts 3 straight in the embedding holes of the base 1 with accuracy by a simple method and a crack and a warp are not generated in the embedding holes as compared with a prior-art method in which the nuts 3 are successively press-fitted in the holes while softening the base 1 by frictional heat due to ultrasonic vibration. Because each the nut 3 has the plurality of flange-shaped projections 3b on the outer peripheral face of the nut 3 with each the projection 3b having the plurality of vertical grooves, the nuts 3 are liable to be locked to the hole walls of the embedding holes 2a and 2b and do not rotate or come out from the embedding holes even if external forces are applied in peripheral and axial directions.

Figure 5:
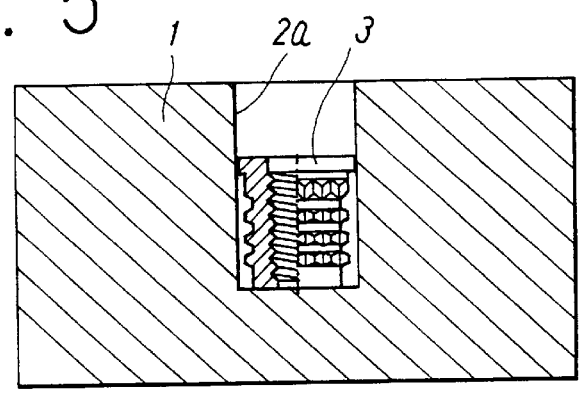
FIG. 5 is a sectional view showing another example of embedding the nut in the base by the method of the invention and a state before embedding.
Figure 6:
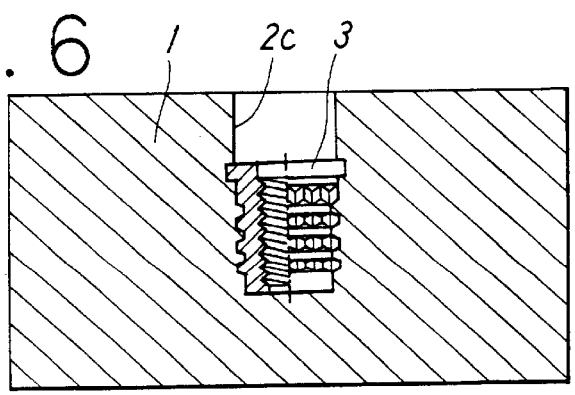
FIG. 6 is a sectional view of a state in which the nut has been embedded in the base by the method in FIG. 5.

Furthermore, by making the depth of the embedding hole 2a formed in the base 1 greater than the axial length of the nut 3 and inserting the nut 3 into a bottom portion side of the embedding hole 2a as shown in FIG. 5, it is possible to embed the nut 3 in an intermediate portion of a wall thickness of the base 1 and to form a small-diameter portion 2c with a diameter smaller than the outside diameter of the nut 3 on an entrance side of the embedding hole 2a by reduction of the hole diameter as shown in FIG. 6.

Figure 7A:
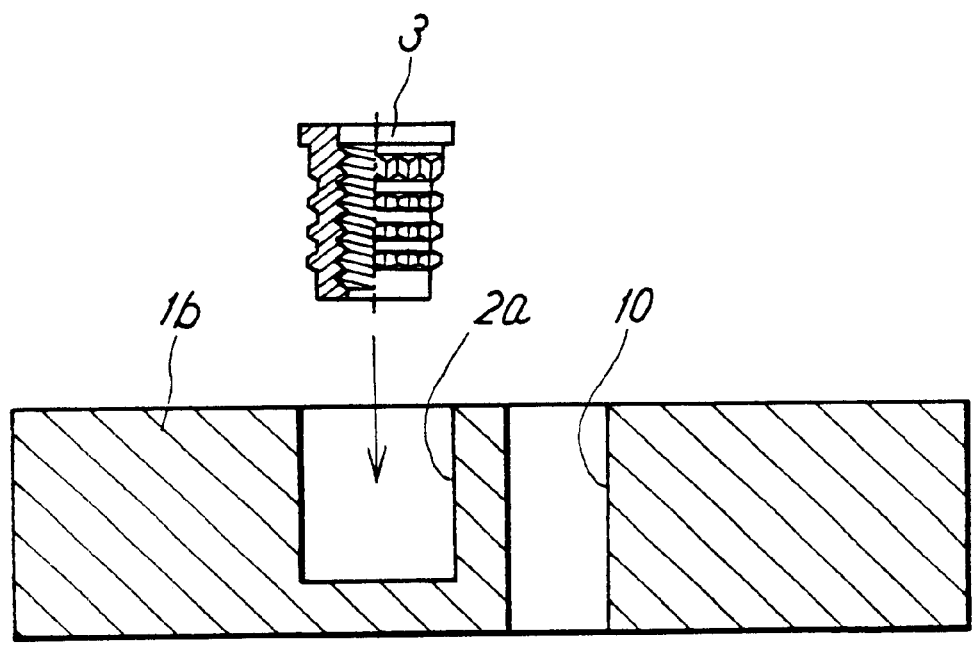
FIGS. 7A and 7B are sectional views showing yet another example of embedding the nut in the base by the method of the invention and a state before the nut is inserted in an embedding hole of each the base.
Figure 7B:
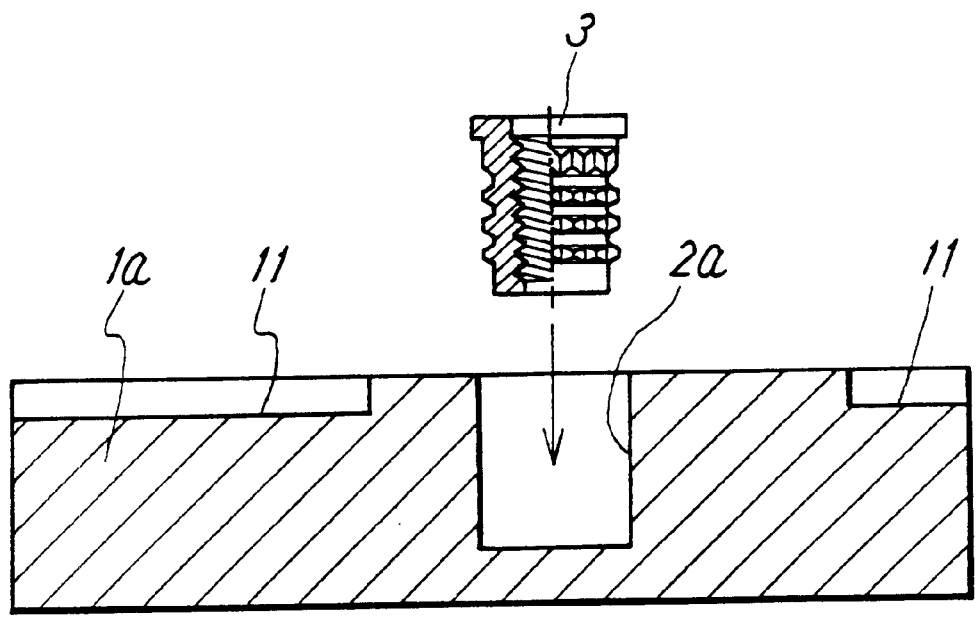
Figure 8:
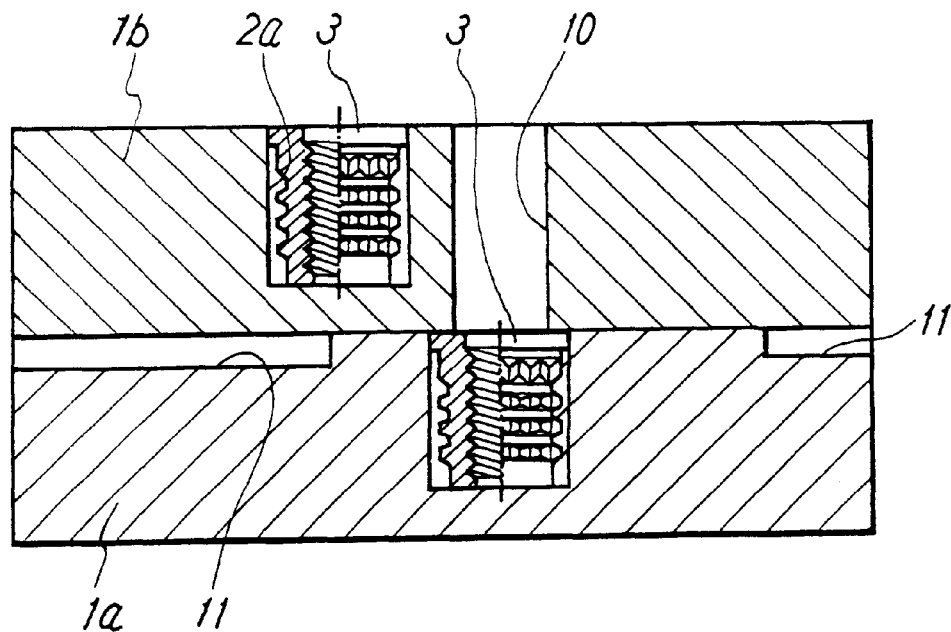
FIG. 8 is a sectional view of a state in which the nuts have been inserted in the embedding holes of the respective base by the method in FIG. 7.

In FIGS. 7(A) to 9, another method for embedding the nut 3 in the intermediate portion of the base is shown. In this method, a first base 1a in which an embedding hole 2a is formed in a junction face and a nut 3 is inserted in the embedding hole 2a and a second base 1b having a through hole 10 with a slightly smaller diameter than the embedding hole 2a as shown in FIGS. 7(A) and 7(B) are used and these bases 1a and 1b are joined to each other such that they are positioned with the through hole 10 communicating with the embedding hole 2a as shown in FIG.8. A groove 11 or the like which will be a flow path of fluid can be formed in the junction face of the first base 1a if necessary and an embedding hole 2a is formed in the second base 1b and a nut 3 is inserted in the embedding hole 2a if the nut is needed to be embedded in the second base 1b.

Figure 9:
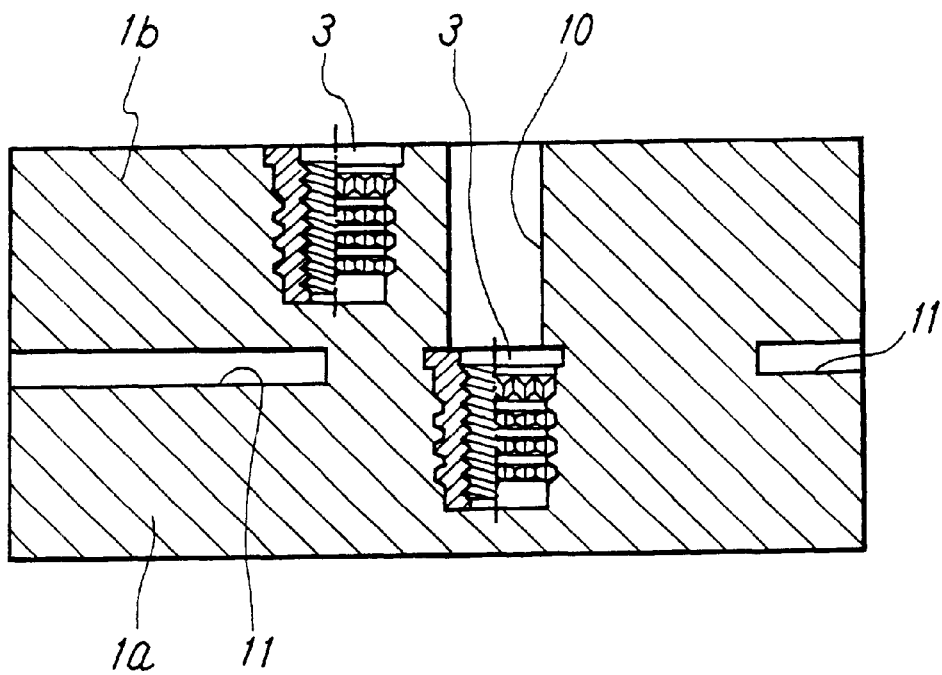
FIG. 9 is a sectional view of a state after both the bases have been connected and the nuts have been embedded in the respective bases by the method in FIG. 7.

Next, a joined body 12 obtained by joining both the bases 1a and 1b is subjected to heating treatment for softening both the bases 1a and 1b to bring the bases 1a and 1b into an elastomeric region and pressurizing treatment from a periphery. As s result, both the bases 1a and 1b expand in inward directions of the embedding holes 2a to reduce hole diameters of the embedding holes 2a, hole walls of the respective holes are deformed along shapes of outer wall faces of the nuts 3 to come in close contact with the outer wall faces, and both the bases 1a and 1b are welded to and integrated with each other through their junction faces. After that, by cooling and hardening the joined body 12, it is possible to obtain a product such as a manifold in which the nut 3 is embedded and fixed into an intermediate portion of the integrated two bases 1a and 1b as shown in FIG. 9.

Heating and pressurization of the joined body 12 can be carried out by using the metal mold 5 as shown in FIG. 3, for example. In a state in which the joined body 12 is housed in the metal mold 5, the joined body 12 is heated through the metal mold 5 and pressurized from above and below by the metal mold 5.

It is also possible to carry out heating and pressurization by a method by using fluid 6 as shown in FIG. 4. In this case, the joined body 12 is preferably vacuum-packed in a covering 8 having heat resistance, airtightness, and flexibility. The joined body 12 may be heated while pressurizing the joined body 12 from a periphery in the fluid 6 by using the fluid 6 as the heat medium or the joined body 12 may be subjected to heating treatment in another place by an oven or the like and then may be immersed and pressurized in the fluid 6.

The groove 11 can be used for supplying liquid such as a chemical agent and a detergent and air to a plurality of holes formed in the base 13, for connecting these holes to a liquid supply source or an air supply source, or for sending liquid, air, or the like from these holes to a common sending portion.

Surfaces of the bases 1a and 1b which have been subjected to machining are washed in advance when the bases 1a and 1b are heated and joined. As this washing, washing in which ultrasonic waves are applied in a washing solution including a surface-active agent, for example, or in pure water, washing in which finish washing by using an ethyl alcohol solution is carried out after the above washing, or the like may be carried out.

As described above, according to a method for laminating the plurality of bases 1a and 1b, the nut 3 can be easily and reliably embedded in the intermediate portion of the two integrated bases 1a and 1b and the hole 10 having the inside diameter smaller than the outside diameter of the nut 3 can be easily formed right above the nut 3.

Figure 10:
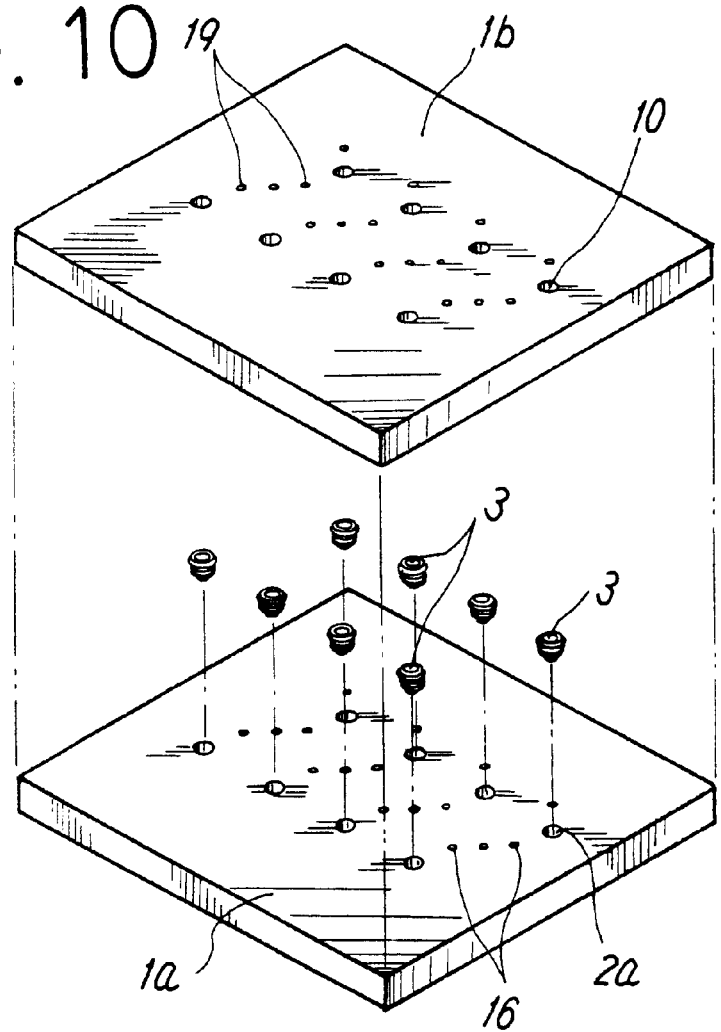
FIGS. 10 to 13 are perspective views showing a step of forming a manifold on which solenoid valves are to be mounted by the method of the invention and a step of mounting the solenoid valves on the manifold.

FIGS. 10 to 13 show steps of forming a manifold 14 by the method for joining the plurality of bases 1a and 1b and mounting the plurality of solenoid valves 15 on the manifold 14. In FIG. 10, the bases 1a and 1b are made of acrylic resin, a plurality of embedding holes 2a into which nuts 3 are to be embedded and a plurality of through holes 16 which will be a fluid flow path are formed in a junction face of the one first base 1a, and a plurality of through holes 10 into which mounting screws 17 are to be inserted and a plurality of through holes 19 which will be the fluid flow path are formed in positions of the other second base 1b corresponding to the respective embedding holes 2a and the through holes 16 of the first base 1a.

Figure 11:
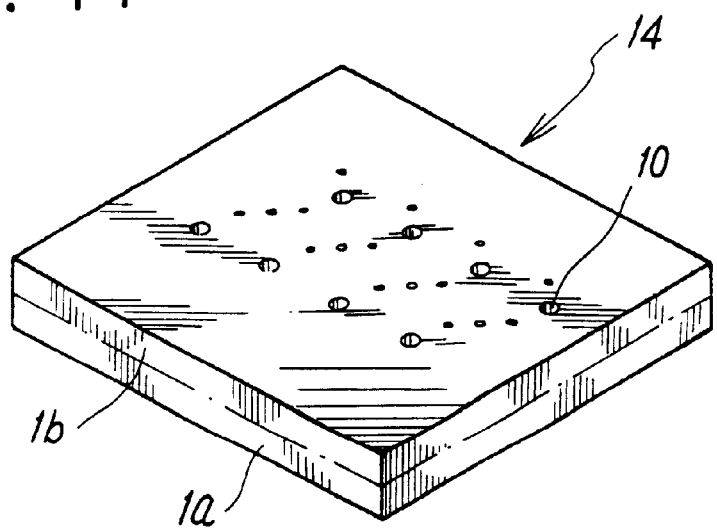

By joining both the bases 1a and 1b to each other and heating and pressurizing the bases 1a and 1b by using the above respective methods, the manifold 14 in which both the bases 1a and 1b are integrated with each other and the plurality of nuts 3 are embedded as shown in FIG. 11 can be obtained.

Figure 12:
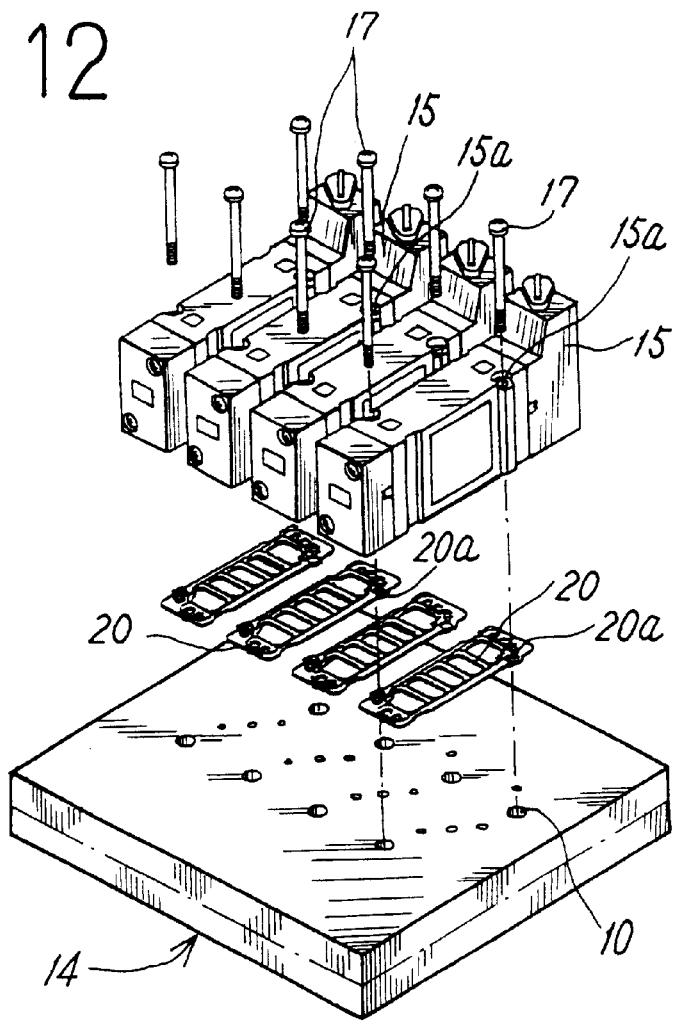
Figure 13:
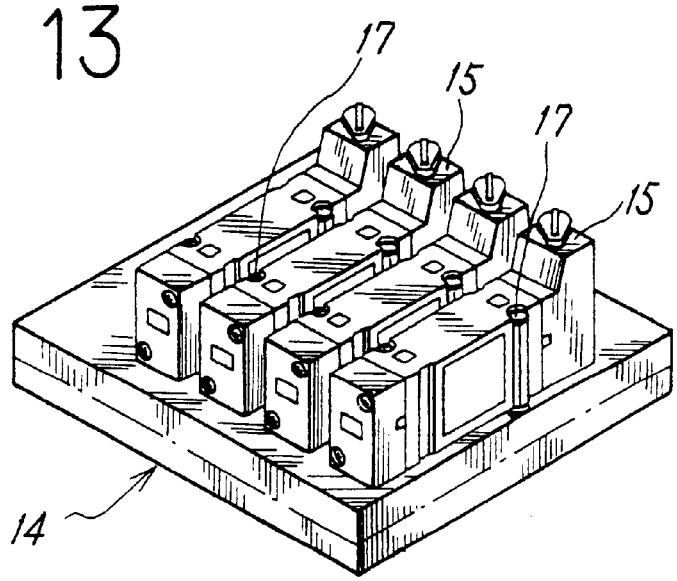

Next, as shown in FIGS. 12 and 13, by disposing the plurality of solenoid valves 15 on the manifold 14 through gaskets 20 and screwing the mounting screws 17 down into the respective nuts 3, the respective solenoid valves 15 are fastened and fixed. Reference numerals 15a and 20a in FIG. 12 designate mounting holes respectively formed in the solenoid valves 15 and the gaskets 20.

Figure 14:
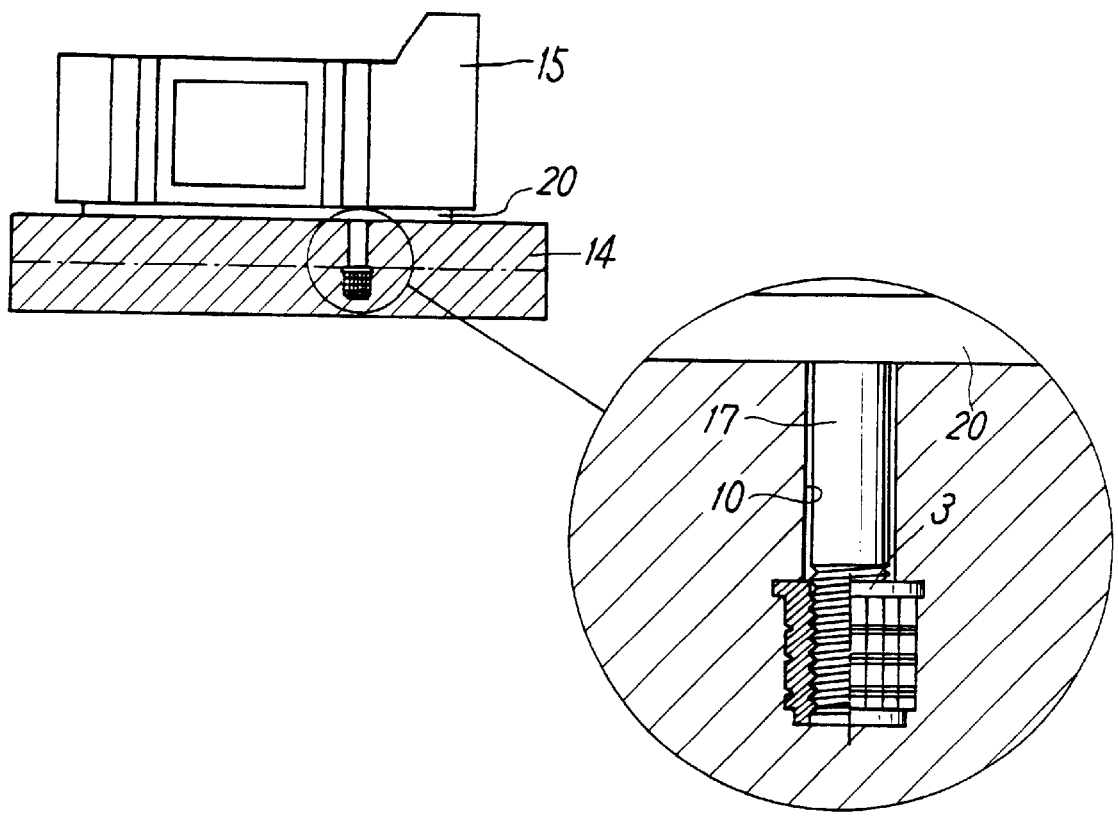
FIG. 14 is a partial sectional view of a case in which the nut is embedded in an intermediate portion of the base and an enlarged view of an essential portion of the case.
Figure 15:
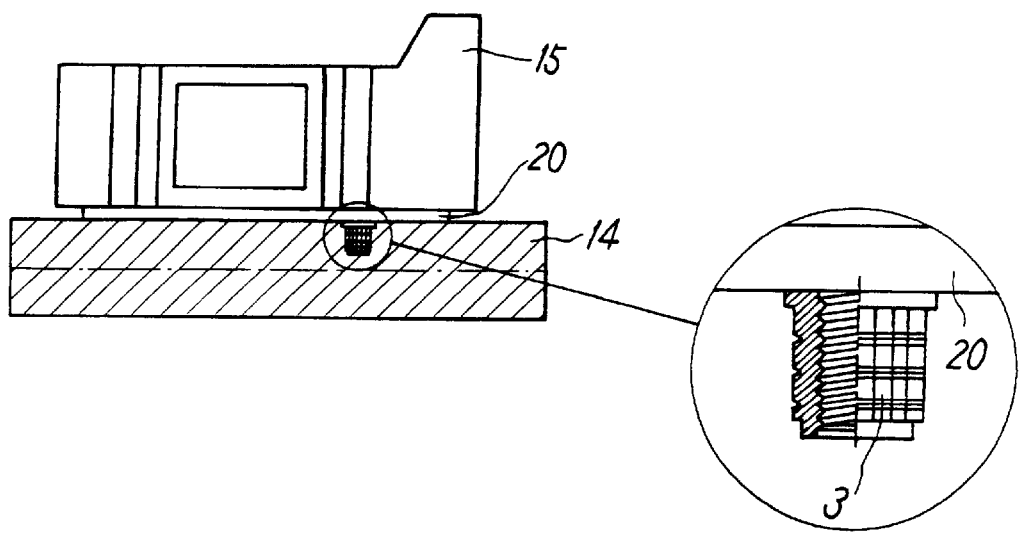
FIG. 15 is a partial sectional view of a case in which the nut is embedded in a surface portion of the base and an enlarged view of an essential portion of the case.

FIG. 14 shows an example in which a solenoid valve 15 is fixed to a nut 3 embedded in an intermediate layer portion of a manifold 14 and FIG. 15 shows an example in which a solenoid valve 15 is fixed to a nut 3 embedded in an outer layer portion of a manifold 14.

Figure 16:
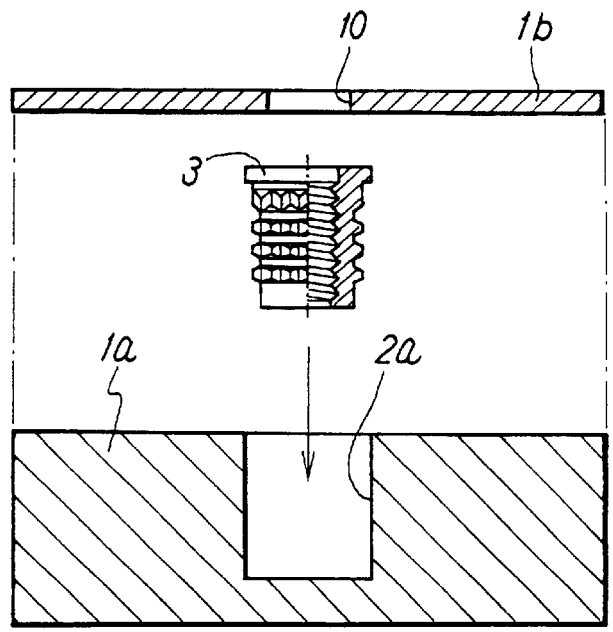
FIG. 16 is a sectional view showing another example of embedding the nut in the base by the method of the invention and a state before embedding.
Figure 17:
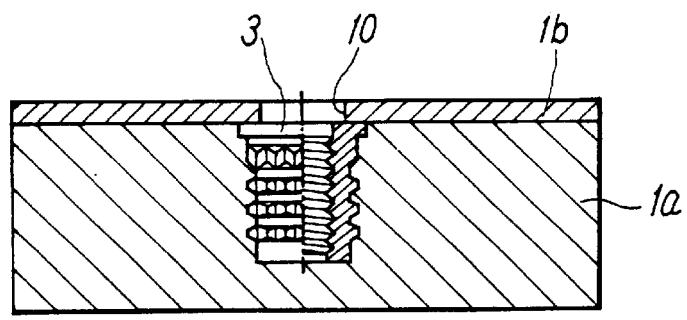
FIG. 17 is a sectional view of a state after the nut is embedded in the base by the method in FIG. 16.

FIGS. 16 and 17 show one in which a nut 3 is embedded in an intermediate layer portion close to an outer layer portion by forming a second base 1b with a smaller wall thickness than a first base 1a in the method for joining the plurality of bases 1a and 1b as shown in FIGS. 7 and 8.

Figure 18:
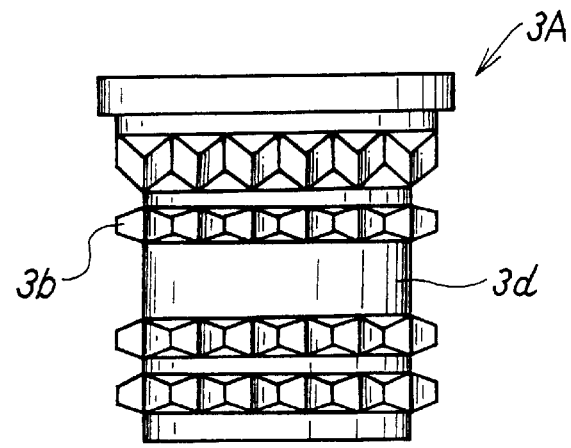
FIG. 18 is a side view of a modification of the nut.

FIG. 18 shows a preferable modification of the nut. In this nut 3A, as compared with the nut 3, a space between the flange-shaped projections 3b is partially increased to form a recessed portion 3d with a large width at a central portion of an outer peripheral face so as to increase an amount of engagement of resin to thereby further improve a fixing property.

Although an example in which the manifold 14 is formed by the method of the invention and the solenoid valves 15 are mounted on the manifold 14 is shown in FIGS. 10 to 15, it is possible to form a member to which a pipe joint, a regulator, a silencer, a cylinder, or the like is mounted can be formed besides the manifold according to the method of the invention.

The embedded part which can be embedded in the base by the method of the invention is not limited to the above metal nut and a necessary part made of metal or synthetic resin can be embedded depending on a product. For forming a magnetic scale, for example, a plurality of magnets can be embedded at regular intervals.

The base may be molded of polycarbonate resin, polyetherimide resin, or the like besides the acrylic resin.

Furthermore, not only two but three or more bases can be joined.

As can be understood from the above description, according to the method of the invention, because the embedded part is inserted in the embedding hole of the base in advance and the base is heated in this state to thereby reduce the hole diameter of the embedding hole and to fix the embedded part in the embedding hole, it is possible to embed the embedded part straight in the embedding hole of the base with accuracy by the simple method as compared with the prior-art method in which the embedded parts are successively press-fitted in the base while softening the base by frictional heat due to ultrasonic vibration.

In combination with the method for laminating the plurality of bases, it is possible to easily and reliably embed the nut in the intermediate portion of the integrated two bases.

What is claimed is:

1. A method for embedding a part in a base made of thermoplastic resin, comprising the steps of:
   forming in a base made of thermoplastic resin an embedding hole sufficiently large for inserting the part therein;
   inserting the part in said embedding hole;
   heating said base to make said base sufficiently elastomeric;
   restraining outward thermal expansion of said base to thereby expand said base in an inward direction of said embedding hole, deform a hole wall of said embedding hole along a shape of an outer wall face of said part and bring said hole wall into close contact with said outer wall face; and
   cooling said base sufficiently so as to harden said base and fix said embedded part in said embedding hole;
   wherein:
      said heating step comprises restricting outward thermal expansion of said base; and
      the restricting outward thermal expansion of said base comprises surrounding said base with a metal mold from outside in close contact with said base to house said base in said metal mold.

2. A method for embedding a part in a base made of thermoplastic resin, comprising the steps of:
   forming in a base made of thermoplastic resin an embedding hole sufficiently large for inserting the part therein;
   inserting the part in said embedding hole;
   heating said base to make said base sufficiently elastomeric;
   restraining outward thermal expansion of said base to thereby expand said base in an inward direction of said embedding hole, deform a hole wall of said embedding hole along a shape of an outer wall face of said part and bring said hole wall into close contact with said outer wall face; and
   cooling said base sufficiently so as to harden said base and fix said embedded part in said embedding hole;
   wherein:
      said heating step comprises restricting outward thermal expansion of said base; and
      the heating step comprises vacuum-packing the base in a flexible covering having heat resistance and airtightness, immersing the base vacuum-packed in the flexible cover in fluid, and increasing temperature of the fluid while applying pressure to the base by increasing pressure of the fluid from a periphery of the base.

3. A method according to claim 1, wherein:
   the forming step comprises making a depth of said embedding hole to be larger than a length of said part;
   the inserting step comprises inserting said part in a bottom portion of said embedding hole; and
   the restraining step comprises restraining the outward thermal expansion of the base to expand said base in the inward direction such that the embedding hole forms an entrance portion having a diameter smaller than an outside diameter of said part.

4. A method according to claim 1, wherein said part is a nut having an outer surface provided with a depression and a projection.

5. A method for embedding a part in a base made of thermoplastic resin, comprising the steps of:
   providing a first base made of thermoplastic synthetic resin having a junction face and a second base made of thermoplastic synthetic resin having a through hole;
   forming in the junction face of the first base an embedding hole sufficiently large for inserting the part;
   inserting the part in said embedding hole;
   joining the second base with the first base such that said through hole is communicating with said embedding hole and that the first and second bases form a joined body;
   heating the joined body to make the joined body sufficiently elastomeric;
   pressurizing a periphery of the joined body to thereby expand said first and second bases in an inward direction, deform a hole wall of the embedding hole along a shape of an outer wall face of said part, bring said hole wall into close contact with said outer wall face, and integrate said first and second bases with each other; and
   cooling said joined body to harden and fix said part in an intermediate portion of said joined body;
   wherein the pressurizing step comprises housing the joined body in a metal mold and pressurizing said joined body with the metal mold while said joined body is heated.

6. A method for embedding a part in a base made of thermoplastic resin, comprising the steps of:
   providing a first base made of thermoplastic synthetic resin having a junction face and a second base made of thermoplastic synthetic resin having a through hole;
   forming in the junction face of the first base an embedding hole sufficiently large for inserting the part;
   inserting the part in said embedding hole;
   joining the second base with the first base such that said through hole is communicating with said embedding hole and that the first and second bases form a joined body;
   heating the joined body to make the joined body sufficiently elastomeric;
   pressurizing a periphery of the joined body to thereby expand said first and second bases in an inward direction, deform a hole wall of the embedding hole along a shape of an outer wall face of said part, bring said hole wall into close contact with said outer wall face, and integrate said first and second bases with each other; and cooling said joined body to harden and fix said part in an intermediate portion of said joined body;

wherein the pressurizing step comprises vacuum-packing the joined body in a flexible covering having heat resistance and airtightness, immersing the joined body vacuum-packed in the flexible cover in fluid, and pressurizing the joined body by increasing pressure of the fluid while increasing temperature of the fluid to subject said joined body to heating treatment.

7. A method according to claim 5, wherein said part is a nut having an outer surface provided with a depression and a projection.

8. A method according to claim 1, wherein:

the base comprises an acrylic resin; and the heating step comprises heating the base to a range between 110° C. and 130° C.

9. A method according to claim 5, wherein:

the first and second bases comprise an acrylic resin; and the heating step comprises heating the joined body to a range between 110° C. and 130° C.

10. A method according to claim 2, wherein:

the forming step comprises making a depth of said embedding hole to be larger than a length of said part;

the inserting step comprises inserting said part in a bottom portion of said embedding hole; and the restraining step comprises restraining the outward thermal expansion of the base to expand said base in the inward direction such that the embedding hole forms an entrance portion having a diameter smaller than an outside diameter of said part.

11. A method according to claim 2, wherein said part is a nut having an outer surface provided with a depression and a projection.

12. A method according to claim 2, wherein:

the base comprises an acrylic resin; and the heating step comprises heating the base to a range between 110° C. and 130° C.

13. A method according to claim 6, wherein the heating step comprises the vacuum-packing step.

14. A method according to claim 6, wherein said part is a nut having an outer surface provided with a depression and a projection.

15. A method according to claim 6, wherein:

the first and second bases comprise an acrylic resin; and the heating step comprises heating the joined body to a range between 110° C. and 130° C.

* * * * *